United States Patent [19]

Lamb et al.

[11] Patent Number: 5,286,782
[45] Date of Patent: Feb. 15, 1994

[54] COATING COMPOSITION OF AN ACRYLIC POLYMER, POLYOL AND POLYISOCYANATE CROSSLINKING AGENT

[75] Inventors: Douglas M. Lamb, Lansdale, Pa.; John A. Simms, Wilmington, Del.

[73] Assignee: E. I. Du Pont de Nemours and Company, Wilmington, Del.

[21] Appl. No.: 937,281

[22] Filed: Aug. 31, 1992

[51] Int. Cl.$^5$ .................. C08L 75/04; C08F 8/30
[52] U.S. Cl. ..................... 524/507; 525/123
[58] Field of Search ............ 524/507; 428/423.1; 525/123

[56] References Cited

U.S. PATENT DOCUMENTS

| | | | |
|---|---|---|---|
| 3,639,147 | 2/1972 | Benefiel et al. | 428/216 |
| 4,246,368 | 1/1981 | Murase | 525/117 |
| 4,507,458 | 3/1985 | Shiraki et al. | 528/49 |
| 4,710,543 | 12/1987 | Chattha et al. | 525/161 |
| 4,728,543 | 3/1988 | Kurauchi et al. | 427/407.1 |
| 4,758,625 | 7/1988 | Boyack et al. | 525/123 |
| 4,808,656 | 2/1989 | Kania et al. | 524/512 |
| 4,892,906 | 1/1990 | Pham et al. | 524/730 |
| 5,159,047 | 10/1992 | Simms | 528/45 |

FOREIGN PATENT DOCUMENTS 8902452  3/1989  World Int. Prop. O.

*Primary Examiner*—Bernard Lipman
*Assistant Examiner*—Wu C. Cheng
*Attorney, Agent, or Firm*—Hilmar L. Fricke

[57] ABSTRACT

A coating composition primarily used as a clear coat of a clearcoat/color coat automotive finish; the composition has a film forming binder solids content of about 30–70% by weight contains about (A) 50–80% by weight, based on the weight of the binder, of an acrylic polymer of polymerized monomers of styrene, and two methacrylate monomers and a hydroxy alkyl methacrylate or acrylate each having 1–4 carbon atoms in the alkyl group and the polymer has a number average molecular weight of about 1,000–12,000 and a calculated Tg of at least 40° C. and (B) 1–20% by weight, based on the weight of the binder, of a polyol component and (C) 10–49% by weight, based on the weight of the binder, of an organic polyisocyanate.

15 Claims, No Drawings

COATING COMPOSITION OF AN ACRYLIC POLYMER, POLYOL AND POLYISOCYANATE CROSSLINKING AGENT

BACKGROUND OF THE INVENTION

This invention is directed to a coating composition and in particular a clear coating composition used for refinishing clear coat/color coat finish of a vehicle such as an automobile or a truck.

Clear coat/color coat finishes for automobiles and trucks have been used in recent years and are very popular. Kurauchi et al U.S. Pat. No. 4,728,543 issued Mar. 1, 1988 and Benefiel et al U.S. Pat. No. 3,639,147 issued Feb. 1, 1972 show the application of a clear coat to a color coat or basecoat in a "wet on wet" application, i.e., the clear coat is applied before the color coat is completely cured.

Productivity of conventional refinish operations using these clear coat/color coat finishes has been lacking in that the conventional refinish clear coating in current use does not dry to a tack free state in relatively short period of time and the vehicle cannot be moved without having foreign particles stick to the clear coat nor can the clear coat be buffed until completely dried to form a finish with acceptable gloss and smoothness. In a typical refinish operation, after the color coat is applied, the clear coat is applied to the vehicle and the resulting finish is allowed to dry before the vehicle is moved. Before any further work can be done to the finish, it must be tack free and must be sufficiently hard to buff to improve gloss or remove minor imperfections. Conventional finishes have long drying and curing times and therefore, reduce the productivity of a refinish operation since the vehicles cannot be moved and worked on quickly after application of the finish.

Also, there is a continued need to use compositions with low VOC (volatile organic content) to meet pollution regulations. It is well known that coating compositions that have a reduced VOC have a high viscosity which reduces the ease of sprayability and application of the composition. To reduce the viscosity of such a composition the molecular weight of the film forming polymer of the composition must be reduced. This further lengthens drying and curing times and reduces the productivity of a refinish operation.

The coating composition of this invention which generally is used as a clear coating dries in a relatively short period of time to a tack-free state and to a hard and glossy finish which allows the vehicle to be moved and the finish can be buffed if necessary and the composition has a lower VOC than conventional compositions in current use. The productivity of a refinish operation using this coating composition can be significantly improved.

SUMMARY OF THE INVENTION

A coating composition having a film forming binder solids content of about 30–70% by weight and an organic liquid carrier, wherein the binder contains about
(A) 50–80% by weight, based on the weight of the binder, of an acrylic polymer of polymerized monomers of styrene, a methacrylate monomer from the group of methyl methacrylate, isobornyl methacrylate, cyclohexyl methacrylate or any mixtures thereof, a second methacrylate monomer from the group of n-butyl methacrylate, isobutyl methacrylate or ethyl hexyl methacrylate or mixtures thereof and a hydroxy alkyl methacrylate or acrylate each having 1–4 carbon atoms in the alkyl group, where the polymer has a number average molecular weight of about 1,000–12,000 determined by gel permeation chromatography and a calculated Tg of at least 40° C.;
(B) 1–20% by weight, based on the weight of the binder, of a polyol component of the formula

wherein:
$R^1$ is a covalent bond or alkylene containing 1, 2, 3 or 4 carbon atoms;
n is about 1 to about 4;
m is 2, 3 or 4; and
Q is a saturated carbocyclic ring containing 5 or 6 carbon atoms, or $S-R^2-T$ wherein S and T are each independently saturated carbocyclic rings containing 5 or 6 carbon atoms, and $R^2$ is a covalent bond or an alkylene group containing 1, 2, 3 or 4 carbon atoms;
provided that no more than one $R^1$ is bound to any carbocyclic carbon atom, and further provided that when Q is $S-R^2-T$, each $R^1$ is bound to a carbon atom of the carbocyclic rings of S and T; and
(C) 10–49% by weight, based on the weight of the binder, of an organic polyisocyanate.

DESCRIPTION OF THE INVENTION

In the repair of a clear coat/color coat finish of an automobile or a truck, generally the color coat is applied and dried for a short period of time but not cured and then the clear coat is applied and both are cured. If necessary the clear coat then is buffed to improve appearance and remove minor imperfections. To improve the rate of processing vehicles through an repair shop, a short drying time for the finish is desired. In particular, a short tack and dust free time is needed for the clear finish so that the vehicle can be moved out of the work area so that another vehicle can be painted. The clear finish should be buffable in a short period of time and remain buffable for several days and up to a week before it cures to tough hard durable finish. For a finish to be buffable it must be hard but not tough.

Preferably, the coating composition of this invention should dry to a tack free state within 3 hours after application and has a Persoz hardness of at least 25 counts.

The coating composition of this invention is solvent based and has a binder solids content of about 30–70% by weight and preferably, for a low VOC composition the binder content is at least 43% by weight. The binder contains about 50–80% by weight of the acrylic polymer, 1–20% by weight of the polyol component and about 10–49% by weight of the organic polyisocyanate.

Generally, the coating composition is used as a clear coat but can be pigmented with conventional pigments and used as a monocoat or as a base coat.

The acrylic polymer used in the coating composition is prepared by conventional solution polymerization techniques in which monomers, solvents and polymerization catalyst are charged into a conventional polymerization reactor and heated to about 60°–160° C. for about 0.5–6 hours to form a polymer having number average molecular weight of about 1,000–12,000, preferably 2,000-8,000 and a weight average molecular weight of about 4,000-25,000.

Molecular weight is determined by gel permeation chromatography using polymethyl methacrylate as the standard.

The acrylic polymer has a calculated glass transition temperature of at least 40° C. and preferably 60°-80° C. The glass transition temperature is calculated by the equation:

$$\frac{1}{TGC} = \sum_i \frac{W_i}{TGH_i}$$

where
- $TGC$- is the glass transition temperature of the polymer in degrees Kelvin;
- $W_i$- is the weight fraction of monomer i in the polymer;
- $TGH_i$- is the glass transition temperature of the homopolymer in degrees Kelvin of monomer i which can be found for example in a source book such as the *Polymer Handbook* by J. Brandrup and E. H. Immergut and published by John Wiley & Sons.

The above equation is discussed on page 29 in *The Chemistry of Organic Film Formers*, 2nd edition, by D. H. Solomon and published by Robert E. Krieger Publishing Co.

The glass transition temperature also can be measured by differential scanning calorimetry.

Typically useful polymerization catalysts are azo type catalysts such as azo-bis-isobutyronitrile, 1,1'-azobis (cyanocyclohexane), acetates such as t-butyl peracetate, peroxides such as di-t-butyl peroxide, benzoates such as t-butyl perbenzoate, octoates such as t-butyl peroctoate and the like.

Typical solvents that can be used are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, ester, acetates and mixtures of any of the above.

The acrylic polymer is composed of polymerized monomers of styrene, a methacrylate which is either methyl methacrylate, isobornyl methacrylate, cyclohexyl methacrylate or a mixture of these monomers, a second methacrylate monomer which is either isobutyl methacrylate, n-butyl methacrylate or ethyl hexyl methacrylate or a mixture of these monomers and a hydroxy alkyl methacrylate or acrylate that has 1-4 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and the like.

One preferred acrylic polymer contains about 5-20% by weight styrene, 10-30% by weight of the methacrylate, 30-60% by weight of the second methacrylate and 10-30% by weight of the hydroxy alkyl methacrylate. The total percentage of monomers in the polymer equal 100%.

One particularly preferred acrylic polymer contains the following constituents in the above percentage ranges: styrene, methyl methacrylate, isobutyl methacrylate or n-butyl methacrylate and hydroxy ethyl methacrylate.

Another particularly preferred acrylic polymer contains the following constituents in the above percentage ranges: styrene, methyl methacrylate, isobornyl methacrylate, 2-ethyl hexyl methacrylate, isobutyl methacrylate and hydroxy ethyl methacrylate.

The polyol component comprises a caprolactone oligomer which has hydroxyl groups, and may be made by initiating caprolactone polymerization with a cyclic polyol. It is known in the art that alcohols (along with certain catalysts), including cyclic alcohols, may be used to initiate the polymerization of caprolactone according to the overall equation:

ROH + Caprolactone ⟶

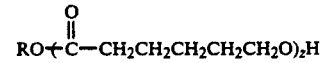

Generally the average degree of polymerization, z, will be the original molar ratio of caprolactone to ROH (or total hydroxyl groups present if ROH were a polyol), assuming the reaction was carried to completion. It is realized by those skilled in the art the product caprolactone oligomer or polymer will have a distribution of degrees of polymerization, z, and that z represents an arithmetic average of that distribution. A general reference for the polymerization of caprolactone is D. B. Johns et al., in K. J. Ivan and T. Saegusa, Ed., Elsevier Applied Science Publishers, Barking, Essex, England, 1984, p. 461-521, which is hereby incorporated by reference.

The component used in the coating composition has the formula

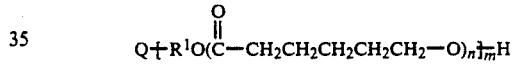

wherein Q, $R^1$, n and m are as defined above. Thus n, is the average degree of polymerization of each caprolactone chain corresponds to z above. It is preferred that n is from about 1 to about 2. The symbol m represents the functionality (number of hydroxyl groups) of the polyol component, and is preferably 2. $R^1$ is a covalent bond or alkylene group that connects the caprolactone chain to the group Q, Q being a carbocyclic ring or the grouping S—$R^2$—T, which also has carbocyclic rings. It is preferred that $R^1$ is a covalent bond or methylene (—$CH_2$—).

When Q is a carbocyclic ring, preferably it is cyclohexylene, more preferably 1,4-cyclohexylene. When Q is S—$R^2$—T it is preferred if $R^2$ is 2,2-propylene or methylene. It is also preferred if both S and T are each cyclohexylene, and more preferred if both S and T are 1,4-cyclohexylene. As stated above, any $R^1$ must be bound to a carbocyclic ring carbon atom (Q, S or T) and no more than one $R^1$ may be bound to any carbocyclic ring carbon atom.

One skilled in the art will understand that to obtain the polyol component wherein Q is 1,4-cyclohexylene, $R^1$ is a covalent bond, n is two and m is two, one would react one mole of 1,4-cyclohexanediol with 4 moles of caprolactone. Similarly, to obtain the polyol component where Q is 1,4-cyclohexylene, $R^1$ is methylene, n is one and m is two, one would react one mole of 1,4-cyclohexanedimethanol with two moles of caprolactone; to obtain the polyol component where Q is S—$R^2$—T and S and T are 1,4-cyclohexylene, $R^2$ is 2,2-propylene, $R^1$ is a covalent bond, n is 2.5 and m is 2, one would react one mole of 2,2-bis(4-hydroxycyclohexyl) propane with 5 moles of caprolactone.

Preferred polyol components are formed from ε-caprolactone and 1,4-cyclohexane dimethanol reacted in a molar ratio of 2/1 to 3/1.

The coating composition also contains an organic polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename "Desmodur" N-3390.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the tradename "Cythane" 3160.

To improve weatherability of the clear composition about 0.1-10% by weight, based on the weight of the binder, of ultraviolet light stabilizers screeners, quenchers and antioxidants can be added. Typical ultraviolet light screeners and stabilizers include the following:

Benzophenones such as hydroxy dodecycloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxy-phenyltriazole and the like.

Hindered amines such as bis(1,2,2,6,6pentamethyl-4-piperidinyl sebacate), di[4(2,2,6,6,tetramethyl piperidinyl)] sebacate and the like and any mixtures of any of the above.

The coating composition contains a sufficient amount of a catalyst to cure the composition at ambient temperatures. Generally, about 0.01-2% by weight, based on the weight of the binder, of catalyst is used. Typically useful catalysts are triethylene diamine and alkyl tin laurates such as dibutyl tin dilaurate, dibutyl tin diacetate, tertiary amines and the like. Preferred is a mixture of triethylene diamine and dibutyl tin dilaurate.

Generally, flow control agents are used in the composition in amounts of about 0.1-5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the coating composition which have the same refractive index as the dried coating. Typically, useful pigments have a particle size of about 0.015-50 microns and are used in a pigment to binder weight ratio of about 1:100 to 10:100 and are inorganic siliceous pigments such as silica pigment having a refractive index of about 1.4-1.6.

In the application of the coating composition as a clear coating to a vehicle such as an automobile or a truck, the basecoat which may be either a solvent based composition or a waterborne composition is first applied and then dried to at least remove solvent or water before the clear coating is applied usually by conventional spraying. Electrostatic spraying also may be used. The dry film thickness of the clear coating is about 0.5-5 mils. The clear coating is dried at ambient temperatures generally in less than 5 minutes to a tack and dust free state. Moderately higher temperatures up to about 40° C. also can be used. As soon as the clear coating is sufficiently cured to be dust free and tack free the vehicle can be moved from the work area to allow for the refinishing of another vehicle.

Generally, within about 3 hours after application, the clear coating is sufficiently cured to allow for buffing and polishing if needed to remove imperfections and improve gloss of the finish. The clear coating cures to a Persoz hardness of at least 25 counts before it can be buffed. The clear coating can cure to a Persoz hardness of up to 350 counts but preferably in the range of about 40-100 counts to form an excellent quality film that can be buffed. The clear coating continues to cure and after 7-10 days reaches a relatively high level of hardness and toughness that is required for a durable and weatherable automotive finish.

Persoz hardness is determined by a GARDCO® Pendulum Hardness Tester model HA-5854 manufactured by BYK Chemie, Germany and sold by Paul N. Gardner Company, Inc. Pompano Beach, Fla. The tester has a digital counter and an LED indicator.

The coating composition of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, reaction injection molded urethanes and partially crystalline polyamides.

The following examples illustrate the invention. All parts and percentages are on a weight basis unless otherwise indicated. Molecular weights are determined by gel permeation chromatography (GPC).

EXAMPLE 1

An acrylic polymer solution was prepared by charging the following constituents into a polymerization reactor equipped with a thermometer, a heating source, stirrer, thermometer, dropping funnel, nitrogen purge and a condenser:

|  | PARTS BY WEIGHT |
|---|---|
| Portion 1 | |
| Xylene | 56.67 |
| Portion 2 | |

|  | PARTS BY WEIGHT |
|---|---|
| Styrene monomer | 15.00 |
| Methyl methacrylate monomer | 20.00 |
| Isobutyl methacrylate monomer | 45.00 |
| Hydroxy ethyl methacrylate monomer | 20.00 |
| T-butyl peracetate solution (75% solids in mineral spirits) | 2.40 |
| Portion 3 | |
| Methyl ethyl ketone | 10.00 |
| T-butyl peracetate solution (75% solids in mineral spirits) | 0.60 |
| Total | 169.67 |

Portion 1 was added to the reactor and heated to its reflux temperature. Portion 2 was premixed and then added at a uniform rate to the reactor over a three hour period while the resulting reaction mixture was maintained at its reflux temperature. Portion 3 was added to the reactor over a one hour period at a uniform rate while maintaining the reaction mixture at its reflux temperature. The reaction mixture was held at its reflux temperature for an additional hour.

The resulting acrylic polymer solution had a polymer solids content of about 58%. The polymer had a number average molecular weight of about 6231 and a weight average molecular weight of about 12,023 determined by gel permeation chromatography using polystyrene as the standard. The glass transition temperature was calculated as 70° C. using the aforementioned equation.

A polyol component was prepared by reacting ε-caprolactone monomer and 1,4-cyclohexanedimethanol in a 3/1 molar ratio. A 5 L round bottom flask was fitted with a reflux condenser. The stirrer was a stainless steel anchor driven by an air motor with rear reduction. A thermocouple was used to measure temperature of the reactants. The following were charged to the reaction flask:

|  | PARTS BY WEIGHT |
|---|---|
| 1,4-cyclohexanedimethanol, (Eastman Chemical Products, Inc., Kingsport, Tennessee CHDM-d Glycol) | 739.80 |
| ε-caprolactone Tone ® Monomer (EC HP, from Union Carbide Corp., Danbury, Connecticut) | 1756.85 |
| 10% solution of dibutyl tin dilaurate in Xylene | 3.35 |
| Total | 2500.00 |

The above components were heated to 140° C. and held at 135° to 145° C. for 4 hours. Gas chromatography showed that the caprolactone had been consumed.

A coating composition was prepared by forming components 1, 2 and 3 and then mixing these components together.

The following ingredients were blended together to form component 1:

COMPONENT 1

|  | PARTS BY WEIGHT |
|---|---|
| Acrylic polymer solution (prepared above) | 58.09 |
| Tinuvin ® 292 (1,2,2,6,6-pentamethyl-4-piperidenyl)sebacate | 0.68 |
| Tinuvin ® 328 (2-(2-hydroxy-3,5-ditertiary amyl phenol)-2H-benzotriazole) | 0.68 |

|  | PARTS BY WEIGHT |
|---|---|
| Triethylene diamine | 0.06 |
| Byk 306 (12% solids in xylene/monophenyl glycol of polyether modified dimethyl polysiloxane copolymer) | 0.59 |
| Dibutyl tin dilaurate | 0.01 |
| Butyl acetate | 1.43 |
| Methyl ethyl ketone | 8.66 |
| Toluene | 18.23 |
| Xylene | 4.71 |
| Methyl isobutyl ketone | 6.60 |
| Ethyl acetate | 0.26 |
| Total | 100.00 |

COMPONENT 2

The following ingredients were blended together to form component 2 which is an activator solution:

|  | PARTS BY WEIGHT |
|---|---|
| Desmodur ® 3390[1] | 43.34 |
| Toluene | 27.29 |
| Butyl acetate | 29.37 |
| Total | 100.00 |

[1]Desmodur ® 3390 - 1,6-hexamethylene diisocyanate based adduct: 90% solids solution in PM acetate and hydrocarbon solvent 1/1 ratio from Miles Inc.

COMPONENT 3

The following ingredients were blended together to form component 3.

|  | PARTS BY WEIGHT |
|---|---|
| Acrylic polymer solution (prepared above) | 82.28 |
| Methyl ethyl ketone | 2.34 |
| Polyol component (prepared above) | 9.97 |
| Tinuvin 328 (described above) | 1.33 |
| Tinuvin 292 (described above) | 1.34 |
| Byk 306 (described above) | 1.16 |
| Xylene | 1.00 |
| Triethylene diamine | 0.11 |
| Ethyl acetate | 0.46 |
| Dibutyl tin dilaurate | 0.01 |
| Total | 100.00 |

A clear coating composition was prepared by blending above components 1, 2 and 3 together in a 1/1/1 volume ratio. The resulting coating composition had a solids content of 45.5% and a binder of acrylic polymer/isocyanate/polyol of 62.6/29.8/7.6 and NCO/OH (isocyanate group to hydroxyl group) molar ratio of 1.0. The composition was sprayed onto a previously coated metal substrate and dried at ambient conditions.

A conventional commercially available refinish clear coating composition was prepared. The composition contained a commercial acrylic polyol that was activated with an isocyanate activator based on hexamethylene diisocyanate and a mid-temperature reducer solvent was added to provide the correct spray viscosity and spray solids. The resulting composition was sprayed onto a previously coated steel substrate and sprayed under the same conditions and dried as above.

The following is a comparison of important properties of the composition of this invention and the conventional refinish composition:

| Property | Composition of Invention | Conventional Clear Composition |
|---|---|---|
| Solids | 45.5% | 38.1% |
| #2 Zahn viscosity | 18.3 seconds | 16.1 seconds |
| Dry-to-touch time | 2-3 minutes | 5 minutes |
| Flexibility | very good | very good |
| Tukon Hardness (Knoops) | | |
| 1 Day | 1.3 | 1.5 |
| 7 Days | 4.1 | 3.9 |
| Persoz Hardness | | |
| 1 Day | 85 | 67 |
| 7 Days | 128 | 99 |
| Swelling ratio in methylene chloride | | |
| 1 Day | 1.80 | 1.68 |
| 7 Days | 1.68 | 1.52 |
| Dry Film Thickness | 2.3 mils | 2.3 mils |
| DOI | 82 | 93 |

The composition of the invention provides an excellent balance of properties, while being at higher solids than the conventional clearcoat. The composition of the invention has an easily sprayable viscosity, virtually equal hardness, cure, appearance, and flexibility, while having an improved dry-to-touch time versus control.

EXAMPLE 2

An acrylic polymer solution was prepared by charging the following constituents into a polymerization vessel equipped as in Example 1:

| | PARTS BY WEIGHT |
|---|---|
| PORTION I. | |
| Xylene | 55.00 |
| PORTION II. | |
| Styrene monomer | 15.00 |
| Methyl methacrylate monomer | 5.00 |
| Isobornyl methacrylate monomer | 23.00 |
| 2 Ethylhexyl methacrylate monomer | 5.00 |
| Isobutyl methacrylate monomer | 32.00 |
| Hydroxyethyl methacrylate monomer | 20.00 |
| T-butyl peracetate solution (75% solids in mineral spirits) | 1.80 |
| PORTION III. | |
| T-butyl peracetate (75% solids in mineral spirits) | 0.66 |
| Methyl Ethyl Ketone | 10.00 |
| Total | 167.46 |

Portion I was added to the polymerization vessel and heated to reflux. Portion II was premixed and added to the reactor at a uniform rate over a 4 hour period while maintaining reflux. Portion III was then added to the reactor over 30 minutes while maintaining reflux, and then the mixture was held at reflux temperature for an additional 30 minutes.

The resulting polymer solution had a solids content of about 59%. The polymer had a number average molecular weight of 3975 and a weight average molecular weight of 8954 determined by GPC and a calculated Tg of 70° C. using the aforementioned equation.

COMPONENT 1

The following ingredients were blended together to form component 1:

| | PARTS BY WEIGHT |
|---|---|
| Acrylic resin solution (prepared above) | 64.88 |
| Polyol component (prepared in Example 1) | 1.42 |
| Butyl acetate | 5.38 |
| Methyl isobutyl ketone | 8.59 |
| Methyl ethyl ketone | 4.49 |
| Xylene | 7.93 |
| Ethyl acetate | 0.32 |
| Toluene | 4.65 |
| Tinuvin ® 328 (described in Example 1) | 0.79 |
| Tinuvin ® 292 (described in Example 1) | 0.79 |
| Byk 306 (described in Example 1) | 0.68 |
| Triethylene diamine | 0.07 |
| Dibutyl tin dilaurate | 0.01 |
| Total | 100.00 |

COMPONENT 2

The following ingredients were blended together to form component 2:

| | PARTS BY WEIGHT |
|---|---|
| Tolonate ® HDT[2] | 48.0 |
| Ethyl acetate | 52.0 |
| Total | 100.0 |

[2]Tolonate ® HDT - 1,6 hexamethylene diisocyanate adduct from Rhone Poulenc, Inc.

A clear coating composition was prepared by blending components 1 and 2 in a 4:1 volume ratio. The resulting composition has a solids content of 45% and a solids binder of acrylic polymer/polyol/isocyanate of 73.2/2.6/24.1 and an NCO/OH molar ratio of 1.0.

The composition was sprayed onto a previously coated metal substrate and dried at ambient conditions.

A conventional commercial available clear coating composition described in Example 1 was sprayed under the same conditions onto a previously coated metal substrate and dried as above.

The following is a comparison of important properties of the composition of this invention and the conventional composition.

| Property | Composition of Invention | Conventional Clear Composition |
|---|---|---|
| Solids | 45.0% | 38.1% |
| #2 Zahn viscosity | 18.4 seconds | 16.1 seconds |
| Dry-to-touch time | 1-2 minutes | 5 minutes |
| Tukon Hardness (Knoops) 1 Day | 2.1 | 1.5 |
| Swelling ratio in methylene chloride | | |
| 1 Day | 2.01 | 1.68 |
| 7 Days | 1.73 | 1.52 |
| Dry Film Thickness | 2.3 mils | 2.3 mils |

The composition of the invention is at a higher solids than the conventional composition while maintaining an easily sprayable viscosity and has acceptable hardness and curing time and improved dry to touch time in comparison to the conventional composition.

We claim:

1. A clear coating composition which cures at ambient temperatures having a film forming binder solids content of about 30-70% by weight and an organic liquid carrier, wherein the binder contains about (A) 50–80% by weight, based on the weight of the binder, of an acrylic polymer consisting essentially of polymerized monomers of styrene, a methacrylate monomer selected from the group consisting of methyl methacrylate, isobornyl methacrylate, cyclohexyl methacrylate or any mixtures thereof, a second methacrylate monomer selected from the group consisting of n-butyl methacrylate, isobutyl methacrylate or ethyl hexyl methacrylate or any mixtures thereof and a hydroxy alkyl methacrylate or hydroxy alkyl acrylate each having 1–4 carbon atoms in the alkyl group; wherein the acrylic polymer has a number average molecular weight of about 1,000–12,000 determined by gel permeation chromatography and a calculated Tg of at least 40° C., (B) 1–20% by weight, based on the weight of the binder, of a polyol component comprising a compound of the formula of

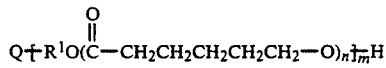

wherein:
R$^1$ is a covalent bond or alkylene containing 1, 2, 3 or 4 carbon atoms;
n is about 1 to about 4;
m is 2, 3 or 4; and
Q is a saturated carbocyclic ring containing 5 or 6 carbon atoms, or S—R$^2$—T wherein S and T are each independently saturated carbocyclic rings containing 5 or 6 carbon atoms, and R$^2$ is a covalent bond or an alkylene group containing 1, 2 or 3 carbon atoms;
provided that no more than one R$^1$ is bound to any c carbocyclic carbon atom, and further provided that when Q is S—R$^2$—T, each R$^1$ is bound to a carbon atom of the carbocyclic rings of S and T and (C) 10–49% by weight, based on the weight of the binder, of an organic polyisocyanate.

2. The coating composition of claim 1 in which the acrylic polymer consists essentially of polymerized monomers of styrene, methyl methacrylate, isobutyl methacrylate and hydroxy ethyl methacrylate.

3. The coating composition of claim 2 in which the acrylic polymer consists essentially of polymerized monomers of 5–20% by weight, based on the weight of the polymer, of styrene, 10–30% by weight of methyl methacrylate, 30–60% by weight of isobutyl methacrylate and 10–30% by weight hydroxy ethyl methacrylate where the total percentage of the monomer equals 100%.

4. The coating composition of claim 1 in which the acrylic polymer consists essentially of polymerized monomers of styrene, methyl methacrylate, isobornyl methacrylate, 2 ethyl hexyl methacrylate, isobutyl methacrylate and hydroxy ethyl methacrylate.

5. The coating composition of claim 1 wherein Q is a saturated carbocyclic ring containing 5 or 6 carbon atoms.

6. The coating composition of claim 5 wherein Q is cyclohexylene.

7. The coating composition as recited in claim 6 wherein Q is 1,4-cyclohexylene.

8. The coating composition of claim 1 wherein R$^1$ is a covalent bond or methylene.

9. The coating composition of claim 7 wherein R$^1$ is a covalent bond or methylene.

10. The coating composition of claim 1 wherein n is about 1 to about 2 and m is 2.

11. The coating composition of claim 1 in which the organic polyisocyanate is an aliphatic or cycloaliphatic polyisocyanate.

12. The coating composition of claim 11 in which the organic polyisocyanate is the trimer of hexamethylene diisocyanate.

13. The coating composition of claim 1 in which the composition contains about 0.01–2% by weight of the binder, of a catalyst of triethylene diamine and an alkyl tin laurate.

14. The coating composition of claim 1 in which the composition contains about 0.1–10% by weight of ultraviolet light absorbers and antioxidants.

15. A substrate coated with a dried and cured layer of the composition of claim 1.

* * * * *